Jan. 3, 1967   R. F. HEALY   3,295,573
PINEAPPLE CORING MACHINE
Filed March 12, 1964   3 Sheets-Sheet 2

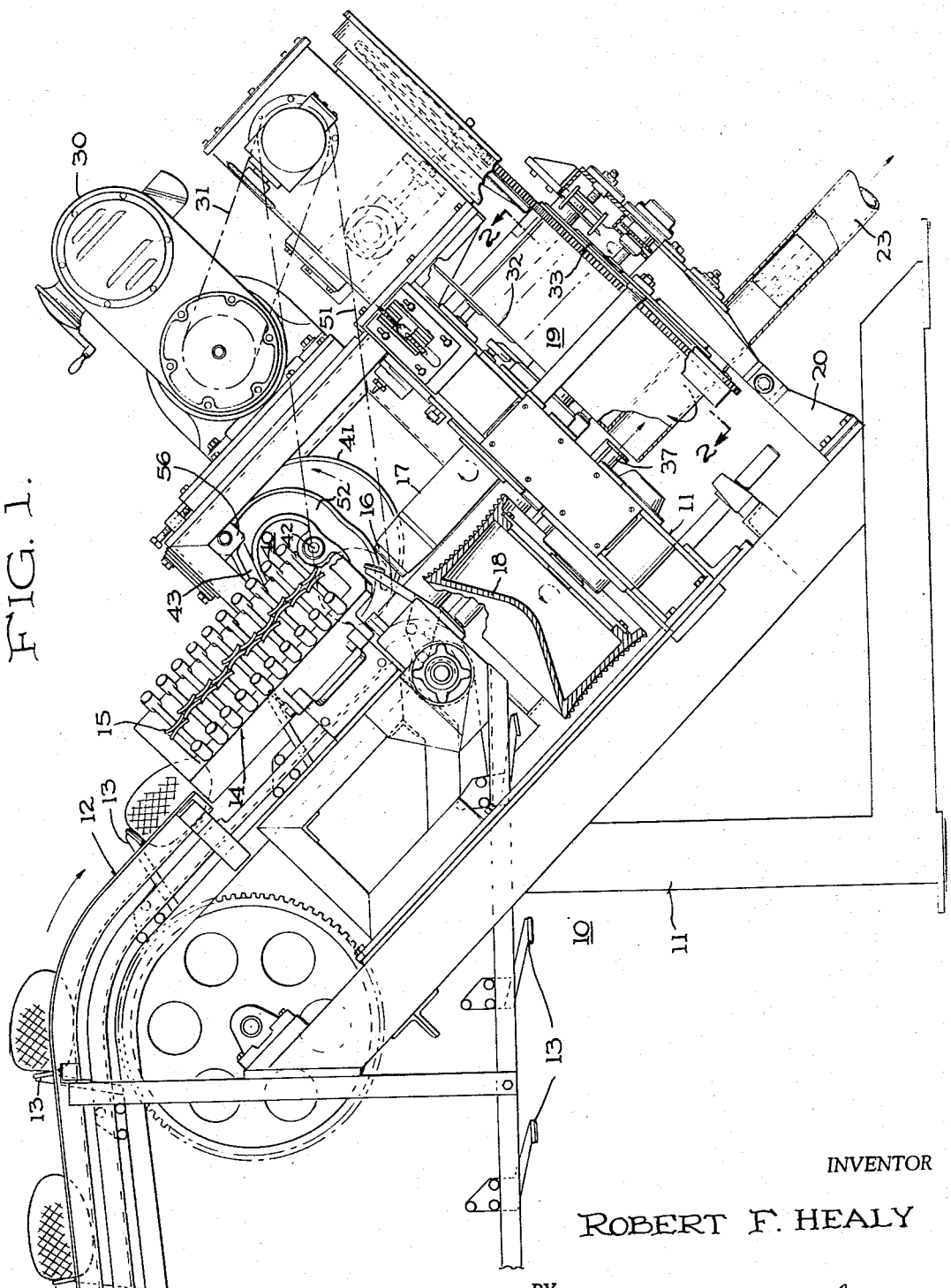

INVENTOR
ROBERT F. HEALY

BY
Cameron, Kerkam & Sutton
ATTORNEYS

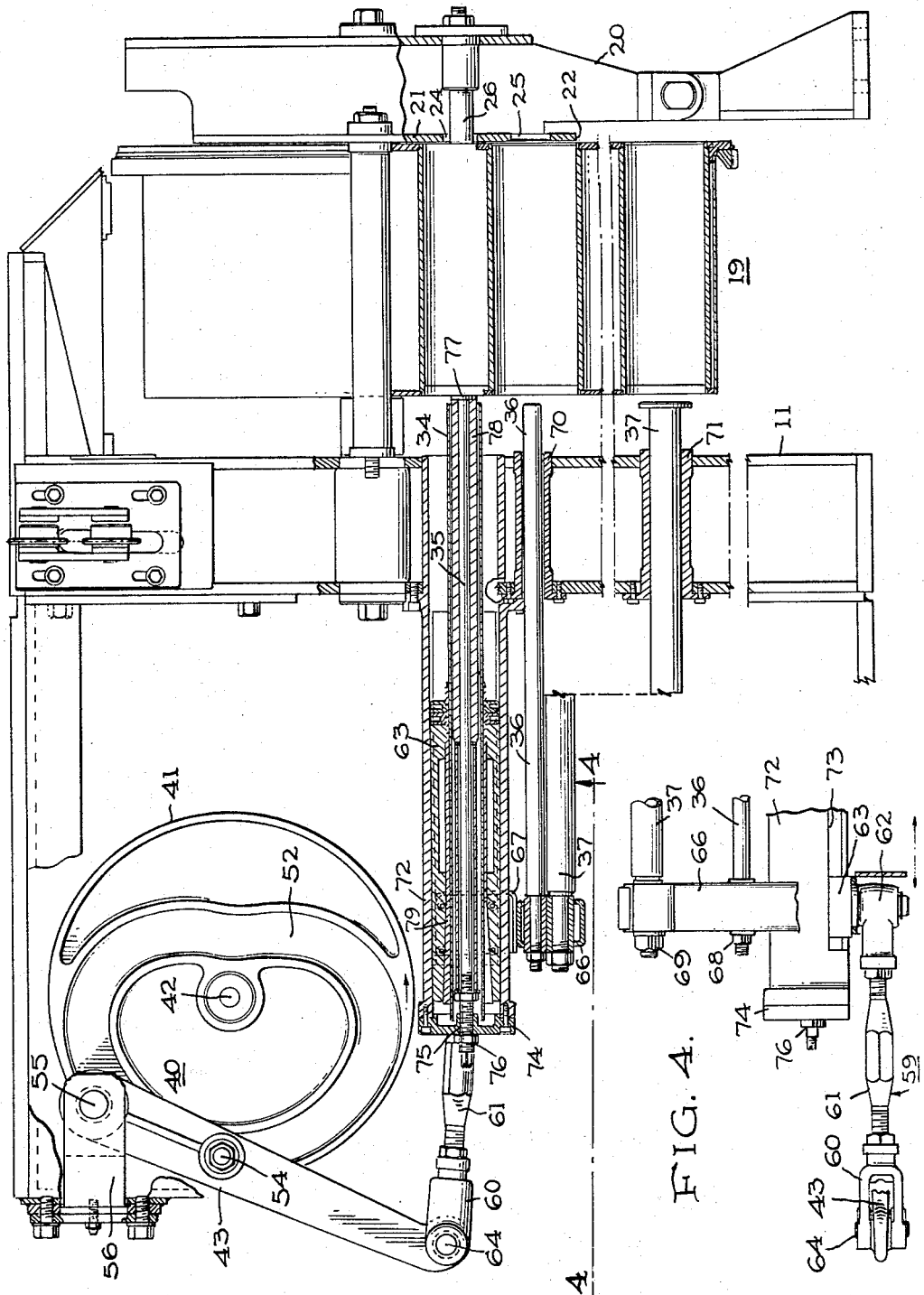

United States Patent Office 3,295,573
Patented Jan. 3, 1967

3,295,573
PINEAPPLE CORING MACHINE
Robert F. Healy, Honolulu, Hawaii, assignor, by mesne assignments, to Castle & Cooke, Inc., Honolulu, Hawaii, a corporation of Hawaii
Filed Mar. 12, 1964, Ser. No. 351,296
8 Claims. (Cl. 146—6)

This invention relates generally to fruit processing machines and more particularly an improved coring mechanism for Ginaca-type fruit processing machines for coring sized fruit cylinders such as, for example, pineapples.

Machines of the Ginaca-type for processing pineapples have long been known and such a machine is described in U.S. Patent No. 1,112,130, granted to Henry G. Ginaca on September 29, 1914. In this structure, sized fruit cylinders are placed in chambers of a revolving turret which is driven with a step by step movement to successive positions where the sized pineapples are treated. While in these chambers, the crown and butt ends of the fruit cylinders are removed and the pineapple is cored. After coring the fruit cylinders are ejected from the chamber by a suitable ejectment mechanism such as, for example, that described in the Stanley Patents Nos. 2,195,-193 and 2,320,054 or the more recent adaptation described in U.S. Patent No. 2,856,097 granted to Malcolm McFaull, Jr., on October 14, 1958. In the more recent Ginaca-type machines, the turret is positioned on an inclined axis to facilitate the admission of the sized fruit cylinders to the chambers of the turret and the removal of the fruit cylinder from the chambers after they have been processed.

In these machines, the coring arrangement generally comprises a hollow coring tube driven by a disk crank. The coring tube is forced through the center of a sized fruit cylinder positioned within a chamber of the turret and is withdrawn with the core remaining within the coring tube. When the next fruit cylinder is moved into position for coring, the procedure is repeated with the core previously withdrawn being forced out of the coring tube upon the subsequent coring operation.

In such arrangements where the core remains inside the coring tube until ejected from the rear as a result of a new core entering the forward end of the coring tube, the pressure exerted on the core to be cut due to the previously cut core being carried within the coring tube results in an internal pressure or crushing effect within the fruit cylinder which often damages the internal structure of the fruit cylinder, thus reducing the number of saleable slices of fruit which can be obtained.

It is therefore an object of the present invention to provide a novel coring mechanism for Ginaca-type fruit processing machine which overcomes the disadvantages of prior art coring mechanisms.

Another object of the present invention is to provide a novel coring mechanism for Ginaca-type pineapple processing machines in which the cored fruit cylinder is not bruised or damaged by the coring operation.

Another object of the present invention is to provide a novel coring mechanism for Ginaca-type fruit processing machines which allows the excised core to be retained within the fruit cylinder after the coring tube is removed and ejected after the cored fruit cylinder has been stepped away from the coring position.

In carrying out the present invention, in one illustrative embodiment thereof, there is provided a novel coring mechanism for a Ginaca-type fruit processing machine. Sized fruit cylinders such as pineapples are positioned by means of an inclined turret rotated step by step to individual operating stations. At the coring station, the core is cut from the fruit cylinder by means of a coring tube. On retraction of the coring tube, the cut core is retained within the fruit cylinder through the action of a stationary stripping rod. The turret is then stepped to bring another fruit cylinder to the coring position while the cored cylinder is positioned at a core ejection station where a core ejector rod moves into contact with the excised core, ejecting it through a suitable opening in the lower end plate of the turret.

The novel coring mechanism of the present invention is capable of various mechanical embodiments, only one of which is shown in the accompanying drawings and hereinafter described to illustrate the invention by way of example. This illustrative embodiment should in no way be construed as defining or limiting the invention, and reference should be had to the appended claims which particularly point out and distinctly claim the subject matter regarding the invention.

In the drawings, where like reference characters indicate like parts,

FIG. 1 is a side elevational view, partly in cross section, of a Ginaca-type fruit processing machine embodying the novel coring mechanism of the present invention;

FIG. 3 is a side elevational view, partly in cross section, of the coring and turret mechanism of the present invention;

FIG. 4 is a partial reverse plan view, partly in cross section, of the core ejector rod and cylinder push rod operating mechanism.

Figure 5:
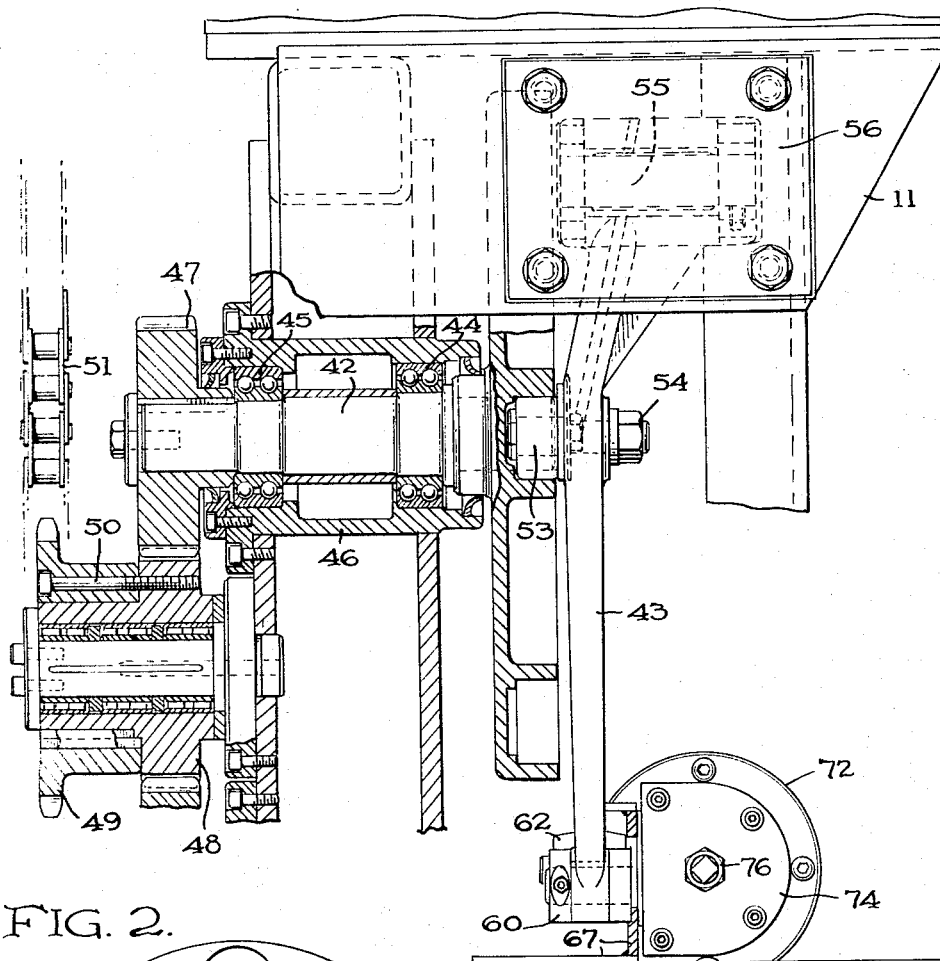
FIG. 5 is a rear elevational view, partly in cross section, of the coring mechanism drive assembly.

Referring now to FIG. 1, the Ginaca-type processing machine is generally indicated at 10 and is suitably supported in an inclined position by framework 11. A conveyor 12 is arranged to feed fruit cylinders such as, for example, pineapples continuously and in properly aligned positions to a fruit sizing mechanism.

The fruit cylinders are aided in their movement along the conveyor 12 by means of pusher elements 13 which project upwardly through the conveyor. Arranged in the path of the fruit cylinders as they are carried by the conveyor is a centering device 14 comprising spring loaded centering fingers 15 which are positioned around the path of the pusher elements 13. Centering device 14 positions the fruit cylinders so that they are presented endwise to a cylindrical sizing knife 16 which is fixed to the tubular sizing mechanism 17.

Sizing knife 16 cuts longitudinally through the fruit cylinders separating, from within the shell, an interior cylinder of meat. The shells are conveyed to an eradicator 18 for retrieving the meat on the interior of the shells in a manner well known in the art, while the sized fruit cylinders are driven from the sizing mechanism 17, in a suitable manner protecting them from harmful impacts, to a turret assembly 19 where the sized fruit cylinders are processed.

The turret assembly 19 is mounted for rotation upon a suitable shaft (not shown) and is supported on bracket 20 affixed to framework 11. Framework 11 is arranged such that turret assembly 19 is positioned on an inclined axis to facilitate the admission of the sized fruit cylinders to the several chambers or compartments identified by the letters A–L which form 12 individual opertaing stations.

The turret assembly 19 includes a stationary end plate 21 which closes off the chambers A–L. End plate 21 is cut away at 22 to allow the cored fruit cylinder to be discharged or ejected through chute 23 to a slicing machine (not shown). In addition, end plate 22 is apertured at 24 and 25. Aperture 24 is aligned with a chamber in the coring position and has extending therein a rod-like member or abutment 26 which is affixed at one end to bracket 20. The other end of abutment 26 bears against the core of the fruit cylinder to exert a counter pressure on the core and to prevent the core from being ejected as it is cut from the main body of the fruit cylinder. Aperture 25 is aligned with the core ejecting position and is maintained clear to allow ejectment of the excised core by operation of a core ejectment mechanism.

Mounted on the framework 11 of the machine is a suitable electric drive 30 which supplies the necessary driving power to the various mechanisms of the machine through a belt or chain drive arrangement 31. The particular driving arrangement for providing stepwise rotation to the turret assembly and power to the other driven elements is not shown in detail, it being understood that any suitable mechanism may be employed such as, for example, that shown in the Ginaca or Stanley patents referred to above.

Figure 2:
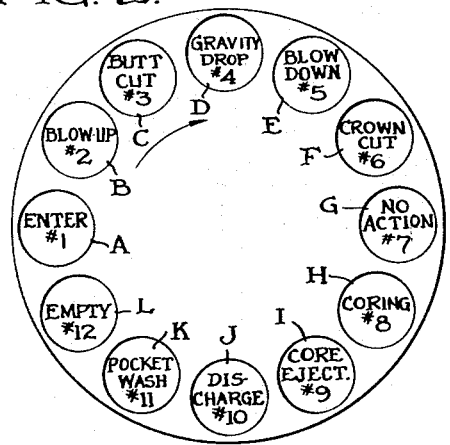
FIG. 2 is a schematic view taken along the axis of the turret mechanism illustrating the several operating positions of the turret assembly.

Referring to FIG. 2, there is illustrated schematically the several operating stations of the turret assembly 19 as viewed along lines 2—2. In the disclosed embodiment, the turret comprises twelve receiving chambers or pockets, each chamber corresponding to an operating station where a separate operation may be performed on the fruit cylinder. The turret mechanism 19 is arranged to be driven to the proper operating position by drive mechanism 30 in a stepwise fashion.

In operation, the sized fruit cylinder enters pocket A while the turret assembly 19 is at rest. The turret assembly 19 is then stepped one position by the driving mechanism 30 in a clockwise direction moving pocket A from position 1 to position 2 where low pressure air forces the sized fruit cylinder within the pocket up against the upper end of the pocket. In the meantime, another fruit cylinder is delivered from the sizing mechanism 17 and enters pocket L which is now at position 1. This operation is continued with each stepwise movement of the turret assembly until pocket A is stepped through all positions and is returned to position 1 thus effecting a continuous and automatic processing of the fruit cylinders carried to the machine by means of the conveyor 12.

From position 2, the blow up station, the next step of the turret assembly 19 carries pocket A to position 3 where the rotating knife blade 32 severs the butt end of the fruit cylinder. At position 4 air pressure is released and the fruit cylinder drops away by gravity from the upper end of the pocket. Stepping of the turret assembly then brings pocket A to position 5 where air is admitted to the upper end of the pocket to effect a blow down and insure that the fruit cylinder is in contact with the pocket bottom. At position 6, the crown end of the fruit is severed by rotating knife blade 33, after which the turret assembly is again stepped to place the A pocket in line with position 7. No action occurs at this position.

Another stepwise rotation brings pocket A to position 8 where core tube 34 enters, cutting the core from the center of the fruit cylinder. On retraction, the core remains in the fruit cylinder by means of a stationary stripping rod 35 which bears against the core as the core tube 34 is withdrawn. The turret assembly is now rotated to position 9 where the core ejector rod 36 is actuated and moves into contact with the cut core, ejecting it through aperture 25 in end plate 21. The next step brings pocket A to position 10 where the sized and cored fruit cylinder is ejected from the pocket by means of push rod 37. Position 11 is a washing station where the empty pocket is washed by a spray of water and position 12 remains empty awaiting the delivery of another fruit cylinder at the loading station, position 1.

Thus far, there has been described in general terms a conventional Ginaca-type fruit processing machine incorporating the novel coring mechanism of the present invention which will now be described in greater detail with particular reference to FIGS. 3–5.

As has been hereinbefore described, the core of the fruit cylinder is cut from the fruit cylinder being processed by reciprocal movement of the core cutting tube 34. Reciprocal movement of the core cutting tube 34 is effected by means of the core tube drive assembly 40 which comprises a coring cam 41 rotatably mounted on a cam shaft 42 and coring cam lever 43 operatively engaging the coring cam 41. Cam shaft 42 is supported for rotation in a conventional manner by bearings 44 and 45 mounted in housing 46 and extends through the bearing housing 46 to support a driving gear 47. Driving gear 47 is arranged for operative engagement with a gear 48 which is rotatably driven by a sprocket 49 affixed to the gear 48 by screw 50. Sprocket 49 is arranged to be driven by means of a chain drive 51 conveniently connected to the drive mechanism 30 for operation in accordance with an established timing sequence for the processing stations of the turret mechanism 19.

The driving force to effect reciprocal movement of the core cutting tube 34 is derived from the core tube drive assembly 40 by means of coring cam lever 43. To this end, one side of coring cam 41 is provided with a channel 52 within which lies a roller 53 affixed intermediate the ends of the coring cam lever 43. Roller 53 may be secured in any convenient manner such as, for example, by bolt 54. One end of the coring cam lever 43 is pivotally supported on rod 55. Rod 55 is affixed to a bracket 56 which is in turn secured to the frame 11.

As coring cam 41 is rotated, the free end of the coring cam lever 43 is swung in an arcuate path. The extent of movement of the free end is determined by the contour of channel 52 which forms a track within which the roller 53 rides thus causing the free end of the lever to be swung inwardly and outwardly. Movement of the lever is transmitted to the core cutting tube 34 through an adjustable connecting mechanism 59 thereby causing the core cutting tube 34 to be moved in a reciprocal manner. In the position as shown, the core cutting tube 34 is retracted from the chamber of the turret mechanism 19. When the coring cam 41 is displaced approximately 180°, the core cutting tube 34 will be forced into the chamber and through the fruit cylinder located therein to cut the core from the cylinder. Each revolution of the coring cam 41 coincides with one step of the turret mechanism 19 so that each fruit cylinder has its core cut as the fruit cylinder is advanced to the core cutting position.

Core cutting tube 34 is connected to the coring cam lever 43 through the adjustable connecting mechanism 59 comprising connection yoke 60, connection rod 61, connection head 62 and slide pin block 63. Connection yoke 60 is pivotally connected through pin 64 to the free end of the coring cam lever 43 and threadedly engages one end of the adjustable connecting rod 61. Connecting rod 61 is conveniently threaded at both ends to facilitate adjustment of the extent of movement of the core cutting tube 34 to thereby adjust the stroke of the core cutting tube. The other end of connecting rod 61 is threadingly engaged with connection head 62 which is in turn secured in a conventional manner to the slide pin block 63.

For carrying the core ejecting rod 36 and cylinder push rod 37 there is provided an extended arm member 66 supported on the slide pin lock 63 by means of bracket 67. Arm member 66 may be formed of any suitable channel material and is provided with a pair of spaced apertures through which the core ejecting rod 36 and cylinder push rod 37 extend. The extending ends of rods 36 and 37 are threaded to receive fastening means 68 and 69 respectively while the other ends of rods 36 and 37 are slidably supported in bearing sleeves 70 and 71 mounted on framework 11. Core cutting tube 34, core ejecting rod 36 and cylinder push rod 37 are spaced from each other in this manner so as to be in proper alignment with their corresponding operating stations in the turret mechanism 19.

As should be readily apparent, the core cutting tube 34, core ejecting rod 36, and cylinder push rod 37 are all actuated simultaneously with the slide pin block 63 to effect operation on three separate fruit cylinders. Thus, cutting of the core, core ejection and discharge of the fruit cylinder along with the other operations within the turret mechanism 19 take place simultaneously with each step.

The core cutting tube 34 and slide pin block 63 are mounted in a housing 72 which is supported on framework 11. Housing 72 is cut away on one side, as at 73, to permit reciprocal movement of the slide pin block. One end of housing 72 is closed by means of cap member 74 which is provided with an aperture 75 through which passes the threaded end of stationary stripping rod 35. Stationary stripping rod 35 is adjustably fastened at the threaded end by means of bolt 76 bearing against the outer end of cap 74. The other end of the stationary stripping rod 35 is provided with a flat disk like member 77 which is positioned at the entrance of the coring chamber in the turret mechanism 19 and serves to bear against the core of the fruit cylinder to prevent the core from being withdrawn with the core cutting tube 34 upon retraction thereof.

Due to the length of the core cutting mechanism, a suitable spacing element 78 may be provided about the stripping rod for supporting the cutting end of the core cutting tube 34. The outer shell of the core cutting tube 34 is conveniently secured to a core tube holder 79 which is in turn affixed to the slide pin block 63 or if desired, the core cutting tube may be affixed directly to the slide pin block 63.

In operation, driving gear 47 is driven in response to the motor drive mechanism 30 in timed relation with the operation of turret mechanism 19 to cause rotation of coring cam 41. As coring cam 41 is rotated, the roller carried by cam lever 43 is dispaced along channel 52 causing lever 43 to be displaced so as to actuate the coring mechanism. As lever 43 is swung inwardly or outwardly, core cutting tube 34 is moved in relation therewith. Inward movement of the lever 43 results in core cutting tube 34 being inserted into the chamber of the turret mechanism 14 at the coring station. Outward movement of the lever 43 effects retraction of the core cutting tube while the stationary stripping rod 35 maintains the excised core within the fruit cylinder at the coring station. Simultaneously with the cutting of the core, the previously excised core, in its fruit cylinder in the adjacent core ejecting station is ejected by operation of the core ejecting rod 36 which pushes the excised core through the opening 25 in back support plate 22 while the cylinder push rod forces a prior cored fruit cylinder into chute 23 for translation to a slicing machine (not shown).

Although one particular embodiment of the invention has been described, it will be obvious to those skilled in the art, that many modifications may be made, and it is therefore intended that the appended claims over all such modifications which fall within the true spirit and scope of the invention.

What is claimed is:

1. In a Ginaca-type pineapple processing machine having a plurality of open ended chambers for the pineapples arranged in a turret rotated to individual operating stations including a coring station after the butt and crown ends of the pineapple are severed, the improvement comprising a coring mechanism having a hollow cylindrically shaped core cutting tube mounted for reciprocation through the chamber at the coring station for cutting of the core of the pineapple within said chamber upon insertion of said core cutting tube, a stationary stripping rod mounted coaxially within said coring tube and arranged to bear against the cut core to retain said cut core within the pineapple when said cutting tube is withdrawn and core ejecting means mounted for reciprocation together with said core cutting tube, said core ejecting means being displaced from said core cutting tube so as to pass through the chamber at the operating station adjacent the coring station for ejecting the cut core from the pineapple.

2. The Ginaca-type pineapple processing machine as set forth in claim 1 further including pineapple ejecting means mounted for reciprocation together with said core cutting tube and core ejecting means, said pineapple ejecting means being displaced from said core cutting tube and core ejecting means so as to pass through the chamber at the operating station adjacent the core ejecting station for ejecting the cored pineapple from the chamber.

3. The Ginaca-type pineapple processing machine as set forth in claim 2 including driving means operable to simultaneous reciprocate said core cutting tube, said core ejecting means and said pineapple ejecting means, said driving means comprising a rotatable cam, a cam driven element and means connecting said cam driven element to said core cutting tube, said core ejecting means and said pineapple ejecting means to effect said simultaneous reciprocation of said core cutting tube, said core ejecting means and said pineapple ejecting means in response to rotation of said cam.

4. The Ginaca-type pineapple processing machine as set forth in claim 3 wherein said rotatable cam includes a channel on one side thereof and said driving means further includes a lever pivoted at one end, a roller supported intermediate the ends of said lever and arranged to ride in said channel and means connecting the other end of said lever to said core cutting tube, said core ejecting means and said pineapple ejecting means to effect reciprocal movement of said core cutting tube, said core ejecting means and said pineapple ejecting means in response to rotation of said cam.

5. The coring mechanism as set forth in claim 1 including driving means operable to effect simultaneous reciprocation of said core cutting tube and said core ejecting means, said driving means comprising a rotatable cam, a cam driven element and means connecting said cam driven element to said core cutting tube and said core ejecting means to effect reciprocal movement of said core cutting tube and said core ejecting means in response to rotation of said cam.

6. The coring mechanism as set forth in claim 4 wherein said driving means comprises a rotatable cam having a channel on one side thereof, a lever pivoted at one end, a roller supported intermediate the ends of said lever and arranged to ride in said channel, and means connecting the other end of said lever to said core cutting tube and said core ejecting means to effect reciprocal movement of said core cutting tube and said core ejecting means in response to rotation of said cam.

7. The coring mechanism as set forth in claim 4 wherein said means connecting said core cutting tube to said cam driven element includes an adjusting mechanism for adjusting the length of the stroke for said core cutting tube.

8. The coring mechanism as set forth in claim 7 wherein said adjusting mechanism comprises a connecting rod threaded at both ends, first means connecting one end of said connecting rod to said driving means, second means connecting the other end of said connecting rod to said core cutting tube, each of said first and second means being arranged for threaded engagement to said one end and other ends of said connecting rods, respectively, whereby whereby the stroke of said core cutting tube may be varied by adjustment of the threaded connection at either end of the connecting rod.

References Cited by the Examiner

UNITED STATES PATENTS 3,057,386  10/1962  Massaro _____ 146—6 X
3,244,209  4/1966   Farmer _____ 146—6
3,246,678  4/1966   Farmer _____ 146—6

FOREIGN PATENTS 115,052  4/1942  Australia.

WILLIAM W. DYER, JR., *Primary Examiner.*

W. GRAYDON ABERCROMBIE, *Examiner.*